Dec. 8, 1970  D. W. STILLMAN ET AL  3,545,066
THREADED ELEMENT INSTALLATION TOOL
Filed Sept. 10, 1968  2 Sheets-Sheet 1
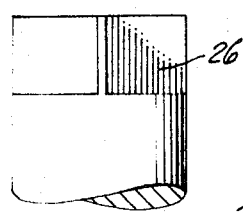
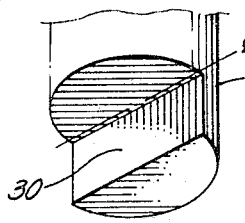
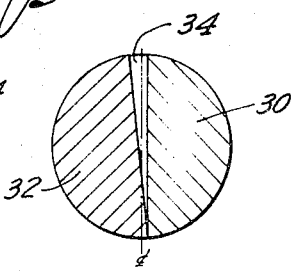
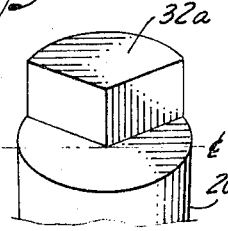
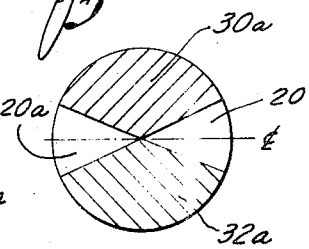
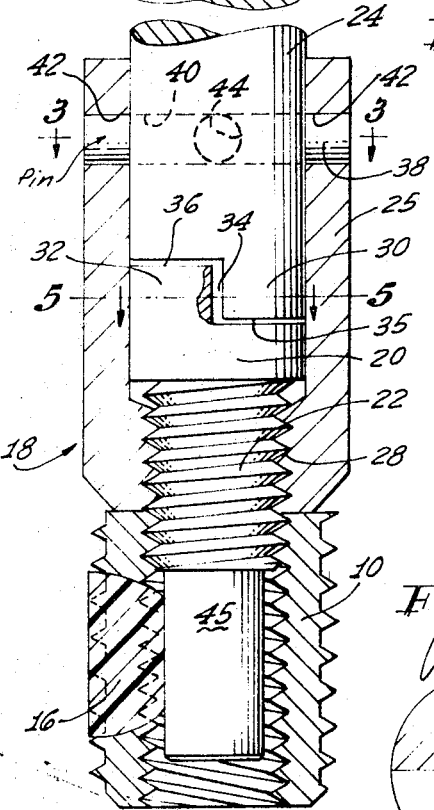
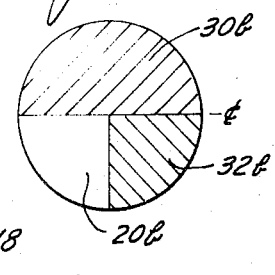
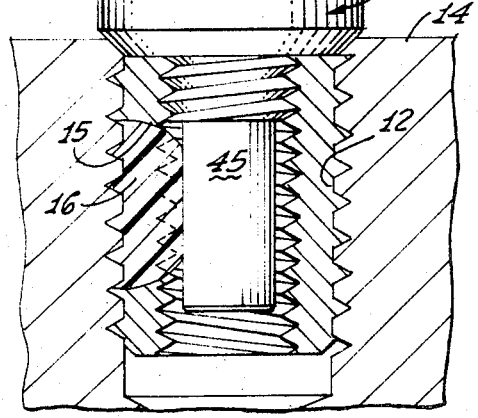
INVENTORS:
Donald W. Stillman
David W. Lang
By Smyth, Roston & Pavitt
ATTORNEYS

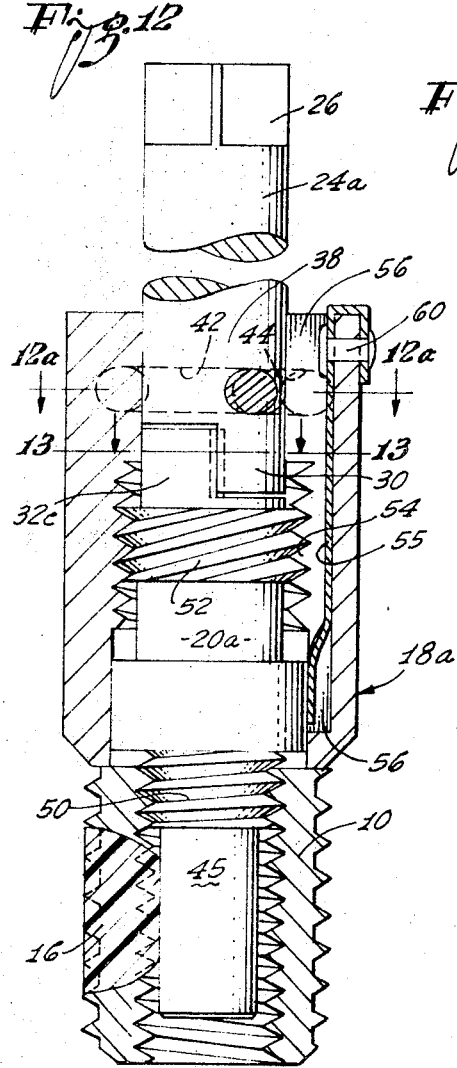
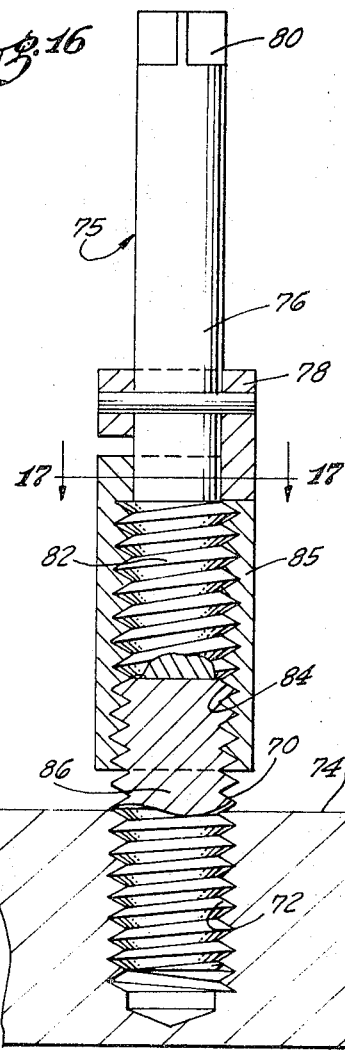
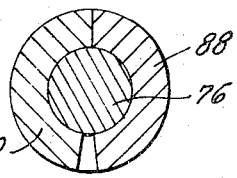
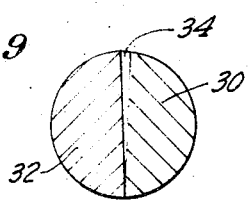
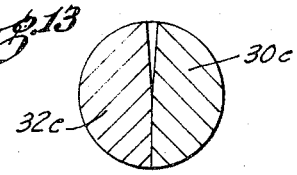
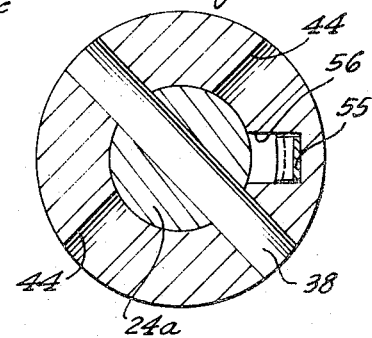
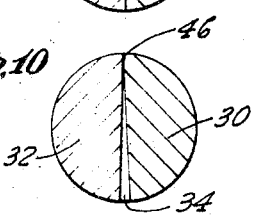
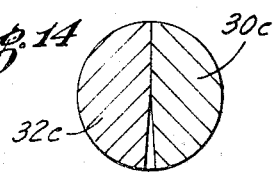
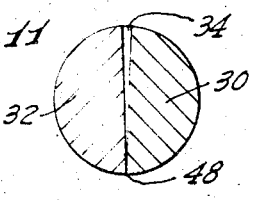
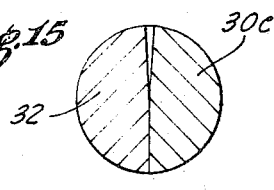

United States Patent Office 3,545,066
Patented Dec. 8, 1970

3,545,066
THREADED ELEMENT INSTALLATION TOOL
Donald W. Stillman, Playa Del Rey, and David W. Lang, Culver City, Calif., assignors to Whittaker Corporation, Los Angeles, Calif., a corporation of California
Filed Sept. 10, 1968, Ser. No. 758,887
Int. Cl. B23p *19/06;* B25b *27/14, 29/02*
U.S. Cl. 29—240                                         10 Claims

ABSTRACT OF THE DISCLOSURE

A tool for installing a threaded insert in a bore of a workpiece comprises a driven member having a threaded end to engage the insert and a driver for the driven member that screw-threadedly and frictionally engages the driven member, the driven member and driver having overlapping parts that provide a lost-motion connection therebetween. Initially with the driver at one limit of the lost-motion, the driver frictionally transmits relatively low torque to the driven member to screw the driven member into engagement with the insert and to draw the insert into effective binding pressure engagement with the driver. Subsequently, while the insert is being driven into the workpiece, the driver shifts to the opposite limit of the lost-motion connection for transmitting high torque to the driven member. When the insert is fully installed reverse rotation of the driver back to the second limit of the lost-motion breaks the binding pressure engagement of the driver with the insert and enables the driver to transmit high reverse torque to the stud for unscrewing the stud from the tubular insert.

BACKGROUND OF THE INVENTION

The simplest tool for driving a tubular insert into a bore of a workpiece comprises a screw to be threaded into the tubular insert and a nut on the screw to be tightened manually into pressure binding engagement with the end of the tubular insert. After the tubular insert is installed in the workpiece, the nut is loosened manually to break the binding pressure engagement and to permit the screw to be unscrewed from the insert. For high production, however, such a procedure is too slow and various installation tools have been developed which initially make binding pressure engagement with the tubular insert automatically and subsequently automatically break the binding engagement in response to initial reverse rotation of the tool. Such tools, of course, have driven members in the form of externally threaded studs that screw into the tubular insert. Tools of this general type include Hogan Pat. 3,282,135, Parnock et al. Pat. 3,290,968 and Neuschotz Pat. 3,269,225.

In general prior art installation tools exemplified by the above mentioned patents have the following disadvantages.

One disadvantage is that if a high pitch operating connection is provided between the driver and the stud to permit a quick break of the binding pressure engagement of the driver with the tubular insert, there may be a tendency for the stud to continue to advance into the insert after the insert contacts the driver, the result being the establishment of the binding pressure engagement at an outer limit position of the stud that makes it difficult to break the binding pressure engagement after the insert is installed.

Another disadvantage in many instances is the lack of an abrupt rise in the resistance of the rotation of the tool when the tubular insert reaches its fully installed position. In the absence of such a definite signal, the operator may continue to apply high driving torque with consequent damage.

Other disadvantages which are found in all of the prior art installation tools relate to the installation of internally and externally threaded inserts which have radial apertures to confine resiliently deformable plastic bodies for making locking engagement not only with the surrounding workpiece but also with the screw that is ultimately threaded into the installed insert. Too often the plastic locking body of the installed tubular insert fails to make effective locking engagement with the surrounding workpiece. In many instances the plastic locking body is displaced inwardly by the installation operation and is subsequently sheared by the insertion of a screw into the insert. Another common difficulty is that the screw thread of the stud that engages the tubular insert damages the plastic locking body to seriously reduce its capacity for locking engagement with the subsequently inserted screw.

The present invention is directed to an installation tool of this general type that avoids all of the abovementioned disadvantages.

SUMMARY OF THE INVENTION

In an embodiment of the invention for installing an internally and externally threaded insert in a bore of a workpiece, as distinguished from a solid externally threaded insert, the driver has a tubular leading end for binding engagement with the end of the tubular insert and a driven member in the form of a stud is rotatably mounted in the tubular leading end of the driver. The driver is frictionally and screw-threadedly engaged with the stud with portions of the driver and stud overlapping in a manner to provide a lost-motion mechanical connection between the driver and the stud.

An important feature of the invention is that the frictional resistance to rotation between the driver and the stud substantially exceeds the frictional resistance to rotation between the stud and the tubular insert when the tubular insert is initially threaded onto the stud into binding engagement with the leading end of the driver. The frictional grip on the stud by the driver will not, however, transmit sufficient torque to break the binding pressure contact between the fully installed tubular insert and the surrounding workpiece.

At what may be termed the first limit of the lost-motion connection between the driver and the stud, the driver is capable of driving the stud in a positive manner in the rotary direction for installing the tubular insert in the workpiece. At the second limit of the lost-motion connection, the driver is capable of positively driving the stud in the opposite rotary direction for the purpose of unscrewing the stud from the fully installed tubular insert.

The described tool construction makes possible an operating cycle having the following stages:

Stage 1: With the starting position of the driver relative to the stud at the second limit of the lost-motion between the driver and the stud, the driver frictionally drives the tubular insert and is also employed to engage the driver ment is established between the driver and the tubular insert.

Stage 2: With the driver still at the second limit position of the lost-motion between the driver and the stud, the driver frictionally drives the stud to initiate screwing of the tubular insert into the workpiece but the frictional resistance to rotation between the tubular insert and the workpiece increases as the tubular insert enters the workpiece.

Stage 3: With the frictional resistance to rotation between the tubular insert and the workpiece increasing to the point of exceeding the frictional resistance to rotation between the driver and the stud, the driver reacts by shifting to the first limit of the lost-motion to drive the stud in a positive manner for completion of the installation of the tubular insert.

Stage 4: With the tubular insert firmly installed in the workpiece the torque that can be frictionally transmitted to the stud by the driver is insufficient to break the binding pressure engagement between the insert and the driver and consequently initial reverse rotation of the driver for the purpose of unscrewing the stud from the tubular insert causes the driver to shift back to its starting position at the second limit of the lost-motion and thus break the binding pressure engagement of the insert with the driver.

Stage 5: Continued rotation of the driver in the reverse rotary direction drives the stud in a positive manner to unscrew the stud from the tubular insert. Thus the cycle ends with the driver again at the second limit of the lost motion ready to start a new operating cycle.

In the presently preferred embodiment of the invention for installing a tubular insert in a workpiece, the stud has a single screw thread which is employed to engage the tubular insert and is also employed to engage the driver and to provide the required friction between the driver and the stud. With relatively few turns of the screw thread exposed for engagement with the tubular stud and with a greater number of turns of the screw threads engaging the driver, the desired degree of frictional resistance to rotation between the driver and the stud is provided by the several turns of the screw thread that make engagement with the driver.

Although the friction of mutually engaging screw threads is employed in the preferred embodiment of the invention for initially frictionally driving the stud, a second embodiment of the invention incorporates special pressure means to create the desired magnitude of frictional resistance to rotation between the driver and the stud.

In the embodiment of the invention, the stud has two separate screw threads, one being employed for engagement with the tubular insert and the other being employed for screw-threaded engagement of the stud with the driver. An advantage of this arrangement is that the second screw thread may be of higher pitch than the first screw thread to facilitate abrupt breaking of the binding pressure engagement between the driver and the tubular insert.

A feature of the invention is the manner in which the leading end of the stud is provided with what may be termed a sizing mandrel to contact the inner surface of the plastic locking body of the tubular insert to block radially inwardly displacement of the plastic locking body. One advantage of limiting the radially inward displacement of the plastic locking body is that the plastic locking body is forced into effective engagement with the surrounding workpiece when the tubular insert is threaded into the workpiece. A second advantage of limiting the radially inward displacement of the plastic locking body is to keep the plastic locking body from protruding inwardly to such extent that the subsequently installed screw will shear away a portion of the plastic body.

In a third embodiment of the invention the same underlying principles are incorporated in a tool for installing a solid externally threaded insert in a workpiece.

The features and advantages of the invention may be understood from the following detailed description together with the accompanying drawings.

BRIEF DESCRIPTION OF THE DRAWINGS

In the drawings, which are to be regarded as merely illustrative:

FIG. 1 is a sectional view of the preferred embodiment of the tool with a tubular insert mounted thereon in preparation for installing the tubular insert in a bore of a workpiece;

FIG. 2 is a similar fragmentary sectional view showing the tubular insert completely installed by the tool;

FIG. 3 is a transverse section along the line 3—3 of FIG. 1 showing how a tubular member of the driver is connected to a shank member of the driver by means of a cross pin;

FIG. 4 is a perspective view of the end portion of the shank member of the driver that overlaps a corresponding end portion of the stud to provide the lost-motion connection between the driver and the stud;

FIG. 5 is a section taken along the line 5—5 showing how the overlapping portions of the driver and the stud cooperate to provide the lost-motion;

FIG. 6 is a perspective view of the upper end of a stud in a modification of the first embodiment wherein the overlapping portions of the driver and the stud differ in configuration from the configurations shown in FIGS. 4 and 5;

FIG. 7 is a sectional view similar to FIG. 5 showing the configuration of the overlapping portions that provide the lost-motion connection in the modification of the first embodiment;

FIG. 8 is a sectional view similar to FIGS. 5 and 7 illustrating different configurations for the overlapping portions of the driver and stud;

FIGS. 9 to 11 are sectional views illustrating different stages in the operation of the first embodiment of the invention;

FIG. 12 is a sectional view of a second embodiment of the invention wherein the stud is provided with two separate screw threads and wherein a leaf spring is provided to increase the frictional resistance to rotation between the stud and the driver;

FIG. 12a is a transverse section along the line 12a—12a of FIG. 12;

FIGS. 13–15 are sectional views illustrating different stages in the operation of the tool shown in FIG. 12;

FIG. 16 is a sectional view of a third embodiment of the invention for installing solid externally threaded inserts in workpieces; and FIG. 17 is a transverse sectional along the lines 17—17 of FIG. 16 showing how overlapping portions of the driver and the tubular driven member provide the required lost-motion between the driver and the driven member.

DESCRIPTION OF THE SELECTED EMBODIMENTS OF THE INVENTION

The first embodiment of the invention illustrated by FIGS. 1–5 is a tool for installing an internally and externally threaded tubular insert 10 in a threaded bore 12 of a workpiece 14, the tubular insert having an elongated radial opening 15 that is formed by a milling cutter to retain a resiliently deformable plastic body 16 for locking engagement both with the workpiece 14 and with a subsequently installed screw (not shown). The installation tool comprises a driver, generally designated 18, and a driven member in the form of a stud 20, the driven member having an external screw thread 22 for engagement with the internal screw thread of the tubular insert 10.

The driver 18 comprises a shank member 24 and a tubular member 25 that fixedly embraces the shank member, the tubular member extending beyond the shank member to form a tubular leading end of the driver. The shank member 24 has an upper end 26 of square cross section to receive torque for actuating the tool and the tubular end of the driver has an internal screw thread 28 in engagement with the external thread 22 of the driven member 20.

In this particular embodiment of the invention, the shank member 24 and the driven member 20 are shaped and dimensioned to provide a lost-motion operating connection between the driver and the driven member. For this purpose the shank member 24 has an end portion 30 that overlaps a cooperating end portion 32 of the driven member 20, the two cooperating end portions being dimensioned for a suitable amount of clearance 34 to provide the desired lost-motion.

In this instance each of the end portions 30 and 32 is of the cross-sectional configuration defined by a chord and an arc of a circle and the total circumferential extent of the two end portions is less than 360°, the difference being the number of degrees of lost rotary motion between the driver and the driven member. It is to be noted that a clearance space 35 is maintained between the driven member 20 and the end face of the end portion 30 of the shank member 24 and a similar clearance space 36 is maintained between the end face of the end portion 32 of the driven member 20 and the end of the shank member 24. Thus the only contact between the shank member 24 and the driven member 20 is in the contact between confronting longitudinal faces of the two end portions 30 and 32.

In the construction shown, the shank member 24 of the driver is fixedly connected to the surrounding tubular member 25 of the driver by a diametrical pin 38 that extends through a diametrical bore 40 of the shank member and further extends through two diametrically opposite radial bores 42 in the tubular member. In this regard, a feature of the invention is the provision of a second air of diametrically opposite radial bores 44 in the tubular member 25 for alternate engagement by the diametrical pin 38. The provision of two sets of radial bores in the tubular member 25 makes it possible to use the two sets of radial bores selectively for adjusting the rotary position of the end portion 39 of the shank member 24 relative to the driver 18 in the initial assembly of the tool and, if desired, even after the tool is placed in service.

The frictional relationship between the driver and the driven member to result initially in greater resistance to rotation between the driver and the driven member than between the driven member and the tubular insert, may be provided in various ways in various embodiments of the invention. A feature of this particular embodiment of the invention is that the desired frictional relationship is obtained simply by exposing relatively few turns of the screw thread 22 of the driven member for engagement of the tubular insert 10 and engaging a substantially larger number of turns of the screw thread 22 with the internal screw thread 28 of the driver. In this instance approximately two turns of the screw thread 22 protrude from the driver for engagement with the tubular insert 10 and approximately four turns of the screw thread 22 mate with the internal screw thread 28 of the driver. This unequal division of the turns of the screw thread 22 results in the resistance to rotation between the driver and the driven member substantially exceeding the resistance to relative rotation between the driven member and the tubular insert when the tubular insert is being initially screwed onto the driven member. It is important to note that the number of turns of the screw thread 22 that are exposed for engagement with the internal screw thread of the tubular insert 10 is insufficient for advance of the screw thread 22 into damaging contact with the plastic locking body 16.

A feature of this embodiment of the invention is that the driven member 22 has an axial extension 45 of reduced diameter which may be aptly termed a sizing mandrel since it maintains the internal size of the tubular insert 10 in the region of the plastic locking body 16. The plastic locking body 16 extends radially inwardly of the tubular insert somewhere beyond the minor diameter of the insert and the sizing mandrel 45 is correspondingly dimensioned to abut the inner radial surface of the plastic locking body. Thus the sizing mandrel 45 blocks any tendency for the plastic locking body 16 to be displaced radially inwardly in the course of the installation of the tubular insert in the workpiece 14.

The operating cycle of the installation tool may be understood by first referring to FIGS. 9 to 11. FIG. 10 shows the first limit of the lost-motion connection between the driver 18 and the driven member 20 at which the clearance 34 between the overlapping end portions 30 and 32 is of the configuration shown with the two end portions in mutual contact in the region 46 for the transmission of clockwise rotation from the end portion 30 to the cooperating end portion 32 in a positive mechanical manner. In FIG. 11 at the opposite limit of the lost-motion between the driver and the driven member, the configuration of the clearance space 34 is reversed with the end portion 30 in contact with the end portion 32 in the region 48 for transmission of counterclockwise rotation from the end portion 30 to the end portion 32 in a positive mechanical manner for unscrewing the driven member from the installed tubular insert. Thus the operating cycle terminates with the relationship shown in FIG. 11 and, fortuitously, this relationship is employed for the first stage of the next operating cycle.

In FIG. 9 which represents the relationship of the cooperating parts at the beginning of an operating cycle, the end portion 30 is not at the first limit of the lost-motion that is illustrated in FIG. 10 and therefore the driver 18 is incapable of actuating the driver 20 in a positive mechanical manner. Instead the friction between the driver 18 and the driven member 20 may be employed for driving the driven member in an impositive or yielding manner.

When a tubular insert 10 is initially threaded onto the leading end of the driven member 20 in preparation for installing the tubular insert in a workpiece, the friction between the tubular insert and the driven member is a great deal less than the static friction between the driven member 20 and the driver 18 with the consequence that the driven member remains immobilized in the driver and the tubular insert may be screwed into binding engagement with the leading end of the driver without any resultant rotation of the driven member relative to the driver. In other words, the relationship of the parts shown in FIG. 9 is maintained until the tubular insert actually enters the bore 12 of the workpiece 14.

Initially the resistance to relative rotation between the driver and the driven member may exceed the resistance to rotation of the tubular member 10 relative to the workpiece 14 even though the diameter of the external thread of the tubular member greatly exceeds the diameter of the external thread 22 of the driven member. As the tubular insert 10 continues to advance into the bore of the workpiece 14, however, the resistance to rotation of the tubular insert relative to the workpiece climbs rapidly and soon exceeds the resistance to relative rotation between the driver and the driven member 20. As a consequence the driver reacts by shifting from the second limit position shown in FIG. 9 to the first limit position shown in FIG. 10 to enable the driver to actuate the driven member 20 in a positive mechanical manner until the tubular insert is completely installed with the driver 18 abutting the workpiece 14 as shown in FIG. 2. The sudden abutment of the driver 18 against the workpiece 14 causes the desired abrupt jump in the torque resistance that signals the completion of the installation of the tubular insert.

The direction of rotation of the driver 18 is then reversed, but in the meantime the effectiveness of the binding pressure engagement between the driver 18 and the outer end of the tubular insert 10 has been greatly increased by the torque required for complete installation of the tubular insert and the torque that can be frictionally transmitted to the driven member by the driver is insufficient to break the binding pressure engagement. As a consequence the driver 18 reacts to the initial reverse rotation by shifting from the first limit of the lost-motion shown in FIG. 10 to the second limit of the lost-motion shown in FIG. 11 first to break the binding pressure engagement and then to enable the driver to reverse the rotation of the driven member in a positive mechanical manner.

In a modification of the first embodiment illustrated by FIGS. 6 and 7, the end portion 30a of the shank member 24 of the driver and the cooperating end portion 32a of the driven member 20a are of the shape of sectors of a circle, i.e. are each defined by an arc and two radii instead of being defined by an arc and a chord of a circle. Here again the total circumferential extent of the cooperating end portions 30a and 30b is less than 360° to provide the desired lost-motion.

FIG. 8 illustrates another modification of the first embodiment in which an end portion 30b of the shank member of the driver 18 is of the configuration of a semi-circle and the cooperating end portion 30b of the driven member 20b is of the configuration of a quadrant of a circle, the range of lost motion being 90° of rotation.

FIG. 12 illustrates a second embodiment of the invention which is largely similar in construction to the first embodiment as indicated by the use of corresponding numerals to designate corresponding parts. This second embodiment differs from the first embodiment essentially in two respects. In the first place, the driven member 20a has two separate screw threads, a first screw thread 50 to engage a tubular insert 10 and a second screw thread 52 to engage an internal screw thread 54 of the driver 18a. In the second place, a leaf spring 55 in an inner longitudinal groove 56 of the driver 18a by means of a rivet 60 exerts pressure against the periphery of the driven member 20a to provide the desired degree of frictional resistance to rotation between the driver and the driven member.

An advantage of providing the driven member 20a with two different screw threads is that the second screw thread 52 may be of somewhat greater pitch than the first screw thread 50 as may be seen in FIG. 12. The greater pitch of the second screw thread facilitates breaking the binding pressure engagement between the driver and the tubular insert when the time comes to withdraw the tool from the tubular insert. Preferably the range of lost motion between the driver and the driven member is correspondingly reduced to avoid excessive axial movement of the driven member relative to the driver.

Preferably the cooperating end portions 30c and 32c in FIG. 12 are of the cross-sectional configurations shown in FIGS. 13–15. Thus each end portion is of the configuration of a sector of a circle of slightly less than 180° circumferential extent. FIGS. 13 to 15 correspond to FIGS. 9 to 11 with reference to the different stages of the operating cycle.

The third embodiment of the invention shown in FIGS. 16 and 17 is employed to install a solid extrnally threaded insert or stud 70 in a threaded bore 72 of a workpiece 74. The tool comprises a driver, generally designated 75, in the form of a shank member 76 with a sleeve 78 fixedly mounted thereon. The shank member has the usual upper end 80 of square cross section to receive torque for actuating the tool and the lower end of the shank member is provided with an external screw thread 82 in engagement with an internal screw thread 84 of a tubular driven member 85. The tubular driven member 85 extends beyond the end of the driver 75 and the pitch of the internal screw thread 84 of the driven member is the same as the pitch of the external thread 86 of the stud 70 to permit the driven member to thread onto the stud.

The sleeve 78 of the driver has an end portion 88 which overlaps a cooperating end portion 90 of the tubular driven member 85, the two overlapping end portions providing the desired lost motion connection between the driver 75 and the driven member 85 as may be seen in FIG. 17.

It is to be noted that the sleeve 78 is secured to the shank member 76 by a cross pin 92 and that the sleeve 78 has a first set of diametrically opposite radial bores 94 and a second set of diametrically opposite radial bores 95 for selective engagement with the pin. Thus the rotary position of the shoulder 88 of the driver is rotatably adjustable relative to the driver.

The third embodiment of the invention operates in the same manner as the first embodiment and for this purpose the number of turns of the internal screw thread 84 of the driven member 85 that engage the external screw thread 82 of the driver 75 exceeds the number of turns of the internal screw thread that are exposed for engagement with the external screw thread 86 of the stud 70. Thus the frictional resistance to rotation between the driver 75 and the tubular driven member 85 initially exceeds the frictional resistance to relative rotation between the tubular driven member and the stud 70. It is apparent that the operating cycle of the third embodiment of the invention is essentially the same as the operating cycle of the first embodiment.

Our description in specific detail of the selected embodiments of the invention will suggest various changes, substitutions and other departures from our disclosure.

We claim:

1. In a tool for installing a threaded insert in a bore of a workpiece, the combination of:
   a driver having a leading end shaped and dimensioned to abut the end of the insert,
   said leading end having a screw thread;
   a driven member carried by the leading end of the driver with the leading end of the driven member extending beyond the leading end of the driver,
   the driven member being screw threaded to engage the screw thread of the insert to bring the insert into binding pressure contact with the driver and to engage said screw thread of the driver for simultaneous relative rotary and axial movement between the driven member and the driver; and
   a lost-motion operating connection between the driver and the driven member for transmitting torque from the driver to the driven member,
   the lost-motion connection having a first limit for positive operating engagement of the driven member by the driver to permit the driver to rotate the driven member in the direction to drive the insert into the workpiece,
   the lost-motion connection having a second opposite limit for positive operating engagment of the driven member by the driver to permit the driver to rotate the driven member in the opposite direction,
   the frictional resistance to torque transmission between the driver and the driven member being greater than the frictional resistance to rotation between the driven member and the insert while the insert is separated from the workpiece, but being less than the rise in frictional resistance between the insert and the workpiece involved in installing the insert in the workpiece.

2. A tool as set forth in claim 1 in which the frictional resistance to rotation between the driver and the driven member is less than sufficient to transmit enough torque to the driver to break said binding pressure contact after the insert is installed in the workpiece, whereby the operating cycle is divided into the following stages:
   Stage 1: With the starting position of the driver relative to the driven member at the second limit of the lost-motion connection, the driver frictionally drives the driven member into engagement with the separated insert until binding pressure contact is established between the driver and the insert;
   Stage 2: With the driver still at the second limit position of the lost-motion connection, the driver frictionally drives the driven member to initiate screwing of the insert into the workpiece with the frictional resistance between the insert and the workpiece increasing as the insert progressively enters the workpiece;

Stage 3: With the frictional resistance to rotation between the insert and the workpiece rising above the frictional resistance to rotation between the driver and the driven member, the driver reacts by shifting to the first limit of the lost-motion connection to drive the driven member in a positive manner for completion of the installation of the insert;

Stage 4: With the tubular insert firmly installed in the workpiece, the torque that can be frictionally transmitted to the driven member by reverse rotation of the driver in insufficient to break the binding pressure engagement between the insert and the driver and consequently initial reverse rotation of the driver for the purpose of unscrewing the driven member from the tubular insert causes the driver to shift back to its starting position at the second limit of the lost-motion and thus break the binding pressure engagement of the insert with the driver; and Stage 5: Continued rotation of the driver in the reverse rotary direction drives the driven member in a positive manner to unscrew the stud from the tubular insert.

3. A tool as set forth in any of claims 1 and 2 in which the driven member is formed with a single screw thread for engagement both with the driver and with the insert.

4. A tool as set forth in any of claims 1 and 2 which includes means acting between the driver and the driven member to exert pressure to create frictional resistance to rotation between the driver and the driven member.

5. A tool as set forth in any of claims 1 and 2 in which the driven member has a first screw thread to engage the insert and a second screw thread in engagement with the screw thread of the driver.

6. A tool as set forth in any of claims 1 and 2 for installing an internally and externally threaded tubular insert having a radial aperture with a resiliently deformable locking body extending through the aperture,
in which the driven member has a sizing mandrel on its leading end shaped and dimensioned to contact the inner side of the locking body for the purpose of blocking radial inward movement of the locking body.

7. A tool as set forth in claims 1 and 2 for installing an internally and externally threaded tubular insert having a radial aperture with a resiliently deformable locking body extending through the aperture, in which the driven member has a sizing mandrel on its leading end shaped and dimensioned to contact the inner side of the locking body for the purpose of blocking radial inward movement of the locking body, and in which a portion of the screw thread of the driven member extends beyond the driver but falls short of the locking body when the tubular insert is screwed onto the driven member into binding pressure engagement with the driver, thereby to prevent distortion of the locking body by the screw thread of the driven member.

8. A tool as set forth in any of claims 1 and 2 in which the driver and the driven member have respective cooperative longitudinally overlapping portions to provide the lost-motion operating connection between the driver and the driven member and the overlapping portion of the driver is rotatably adjustable relative to the driver.

9. A tool as set forth in any of claims 1 and 2, in which the driver and the driven member have respective cooperative longitudinally overlapping portions to provide the lost-motion operating connection between the driver and the driven member and the overlapping portion of the driver is rotatably adjustable relative to the driver, and in which the leading end of the driver is tubular with an internal screw thread and in which the driven member is externally threaded to engage the internal screw thread of the driver and to engage the screw thread of the insert.

10. A tool as set forth in any of claims 1 and 2 in which the driven member is tubular and internally threaded for engagement with the driver and the insert; and
in which the driver has an external screw thread in engagement with the driven member.

References Cited

UNITED STATES PATENTS

| | | | |
|---|---|---|---|
| 877,153 | 1/1908 | Wolfrey | 81—3X |
| 3,390,515 | 12/1945 | Cram | 29—240.5X |
| 2,851,768 | 9/1958 | Ellis | 29—240X |
| 3,254,690 | 6/1966 | Neuschotz | 81—53.2X |
| 3,269,225 | 8/1966 | Neuschotz | 81—53.2 |
| 3,279,053 | 10/1966 | Neuschotz | 29—240X |
| 3,280,666 | 10/1966 | Neuschotz | 81—53.2 |
| 3,289,290 | 12/1966 | Sandor | 29—240X |
| 3,297,071 | 1/1967 | Neuschotz | 151—22 |
| 3,322,005 | 5/1967 | Neuschotz | 29—240X |
| 3,368,430 | 2/1968 | Levering | 81—53.2 |
| 3,388,621 | 6/1968 | Neuschotz | 29—240X |
| 3,390,597 | 7/1968 | James | 29—240X |
| 3,413,876 | 12/1968 | Shinn | 81—53.2 |
| 3,417,641 | 12/1968 | Shinn | 81—53.2 |
| 3,446,101 | 5/1969 | McKay | 29—240X |
| 3,481,022 | 12/1969 | Neuschotz | 29—240.5 |

FOREIGN PATENTS

| | | | |
|---|---|---|---|
| 185,220 | 9/1963 | Sweden | 29—240 |

WAYNE A. MORSE, JR., Primary Examiner

U.S. Cl. X.R.

81—3, 53.2